United States Patent
Hashimoto et al.

[15] 3,644,223
[45] Feb. 22, 1972

[54] PROCESS OF PREPARING POLYEPOXIDES

[72] Inventors: Koji Hashimoto; Noboru Mogi, both of Yokohama-shi; Makoto Shindo, Kawasaki-shi, all of Japan

[73] Assignee: Showa Denko Kabushiki Kaisha, Tokyo, Japan

[22] Filed: Aug. 13, 1969

[21] Appl. No.: 849,860

Related U.S. Application Data

[63] Continuation-in-part of Ser. No. 527,083, Feb. 14, 1966.

[30] Foreign Application Priority Data

Feb. 20, 1965 Japan.....................................40/9358
Sept. 24, 1965 Japan..................................40/58079

[52] U.S. Cl. ................................260/2, 252/431, 260/80.3, 260/88.3
[51] Int. Cl. .............................................................C08f 7/12
[58] Field of Search .........................260/2, 615, 88.3, 80.3; 252/431

[56] References Cited

UNITED STATES PATENTS

| | | | |
|---|---|---|---|
| 2,706,189 | 4/1955 | Pruitt et al. | 260/45.95 |
| 2,911,377 | 11/1959 | Gurgiolo et al. | 260/2 |
| 3,065,187 | 11/1962 | Vandenberg | 260/2 |
| 3,065,188 | 11/1962 | Vandenberg | 260/2 |

*Primary Examiner*—Harry Wong, Jr.
*Attorney*—Sherman and Shalloway

[57] ABSTRACT

A process for preparing polyepoxides comprising polymerizing or copolymerizing 1,2-epoxides, using as the catalyst a composition composed of:

- a. A metal salt of a carboxylic acid, e.g., lead, chromium, manganese, cobalt, nickel or iron salt;

- b. At least one organoaluminum compound, e.g., trialkylaluminum and dialkylaluminum halides; and optionally

- c. At least one ether;

said catalyst composition being prepared by mixing (a), (b) and (c) and thereafter holding the mixture at a temperature higher than that at which the 1,2-epoxides are to be polymerized, for a period ranging from 1 minute to a few hours.

6 Claims, No Drawings

1

PROCESS OF PREPARING POLYEPOXIDES

This application is a continuation-in-part of copending application Ser. No. 527,083, filed Feb. 14, 1966.

The present invention relates to a process for preparing polyepoxides; more particularly the present invention relates to a commercially advantageous process of efficiently preparing, from 1,2-epoxides, homopolymers or copolymers of a high degree of polymerization, the process being carried out with a relatively short reaction time.

It has been known that the organometalic compounds of the metals of Group III of the periodic table exhibit polymerization activity with respect to the 1,2-epoxides (J.Polym. Sci. 27,584, 1958). However, the degree of polymerization of the polymers obtained by the use of these organometallic compounds alone is very low. For the purpose of raising the degree of polymerization and thus to obtain commercially valuable polymers, numerous improvements with respect to the catalyst used have been made in the past. For instance, there is a method wherein a catalyst is used consisting of organoaluminum compounds in which acetylacetonates of titanium, chronium, vanadium, iron or cobalt have been incorporated. Another method is one in which the catalyst used is one in which the organoaluminum compounds are incorporated with a hydroxide of a metal of either Group II or Group III of the periodic table. These methods, though having their strong points, also have weak points. For instance, they have one or more of the following shortcomings. For instance, while the reaction proceeds smoothly, there is much time required in preparing the catalyst or special posttreatments are required employing elevated temperatures; that the reaction time is extremely long so as to not be commercially profitable; or that the material to be incorporated is one which is expensive and moreover not recoverable.

On the other hand, U.S. Pat. No. 2,933,459, discloses a process of polymerizing 1,2-epoxides using stannous carboxylates as the catalyst. In this process, however, it is only after the reaction has been carried out over a length period of 40–60 hours at a temperature of 80°–130° C. that the polymerization makes any substantial progress. Moreover, the yield at which the polymer is obtained is considerably low and its molecular weight is not necessarily high. Additionally, as a process of obtaining polyepoxides having rubberlike elasticity and of low crystallinity, U.S. Pats. No. 3,135,705, and No. 3,135,706, teach processes of using a catalyst prepared from organoaluminum compounds, water and chelating agents. However, the molecular weight of the polymer obtained by such processes is relatively low and the polymer is tacky. Hence, it is somewhat lacking in rubber processability. Further, much time is required in preparing and aging the catalyst to be used in this process, and hence there is still room for improvement in this respect.

It is accordingly a principal object of the present invention to provide a process for the homopolymerization or copolymerization of 1,2-peroxides, which process eliminates the inherent deficiencies of the aforedescribed prior art.

It is a further object of the present invention to provide such a process for the production of homopolymers or copolymers of 1,2-peroxides having high molecular weight and high or low crystallinity, such process being characterized by employing a catalyst composition comprising a metallic salt of a carboxylic acid and an organoaluminum compound prepared by mixing and holding at a temperature higher than that at which the polymerization is to be conducted for a period ranging from about 1 minute to a few hours.

It is yet a further object of the present invention to provide such a process wherein the catalyst composition additionally contains an optional ether component.

Still further objects and advantages of the novel process of the present invention will become more apparent from the following more detailed description thereof.

The process of this invention, as hereinafter fully described, comprises polymerizing or copolymerizing 1,2-epoxides using a new catalyst, namely, a catalyst composed of the two components of (a), a specific metal salt of a carboxylic acid and (b) a specific organoaluminum compound; or the three components consisting of the foregoing two components and (c) a specific ether. In accordance with the present invention, the catalyst composition employed in the process of the present invention is prepared by mixing the above-noted two or three components and thereafter holding the mixture at a temperature higher than that at which the 1,2-epoxides are to be polymerized, for a period ranging from about 1 minute to a few hours. Generally speaking, when it is desired to obtain a polymer having high crystallinity, the foregoing two-component catalyst is used. On the other hand, when it is desired to obtain a polymer having low crystallinity, the foregoing three-component catalyst is used.

Any 1,2-epoxide may be homopolymerized or copolymerized with a second 1,2-epoxide by the process of this invention to obtain improved results. Typical examples of 1,2-epoxides that may be homopolymerized or copolymerized are alkylene oxides, and particularly those containing 2 to 4 carbon atoms in their molecule, these include such as ethylene oxide, propylene oxide, n-butylene oxide and isobutylene oxide; epihalohydrins such as epichlorohydrin and epibromohydrin; epoxyethers such as methyl glycidyl ether, ethyl glycidyl ether and allyl glycidyl ether; and other 1,2-epoxides such as butadiene monoxide, styrene oxide, etc.

The metal salt of a carboxylic acid, i.e., component (a) which is one of the components making up the catalyst used in this invention, is at least one of the salts of a metal selected from the group consisting of Pb, Cr, Mn, Co, Ni and Fe, and a carboxylic acid selected from the group consisting of the saturated and unsaturated monocarboxylic acids containing from 2 to 18 carbon atoms in their molecule, naphthenic acid and tall oil acid. Of these metal salts, Cr- or Co- salt is preferably used. Copending application Ser. No. 527,083 defines a similar invention wherein a zirconium salt of a carboxylic acid is employed as one component of a two or three component catalyst system for the homopolymerization or copolymerization of 1,2-epoxides, the disclosure of this application is hereby incorporated by reference.

Typical examples of the foregoing aliphatic monocarboxylic acids include the saturated carboxylic acids such as acetic acid, propionic acid, butyric acid, caproic acid, octylic acid, 2-ethyl-hexanoic acid, lauric acid, myristic acid, palmitic acid and stearic acid; the unsaturated carboxylic acids such as acrylic acid, crotonic acid, octenoic acid, oleic acid, etc. Of these carboxylic acid salts, the salts of either octylic acid or 2-ethyl-hexanoic acid are preferably used.

The organoaluminum compound, i.e., component (b), which is one of the other components making up the catalyst used in this invention, is at least one compound selected from trialkylaluminums and dialkylaluminum monohalides, wherein the alkyl group contains from 1 to 6 carbon atoms. Typical examples of said trialkylaluminums include trimethylaluminum, triethylaluminum, triisobutylaluminum, trihexylaluminum, etc. Typical examples of said dialkylaluminum monohalides include dimethylaluminum chloride, diethylaluminum chloride, diethylaluminum bromide, dibutylaluminum chloride, etc. Of the trialkylaluminums, triethylaluminum and triisobutylaluminum are particularly preferred.

The catalyst used in accordance with this invention is one which is composed of the aforementioned two components (a) and (b) or one which is composed of the foregoing two components to which is further added the following component (c).

The third component (c) is at least one ether selected from the group consisting of three- to six-membered cyclic ethers, three- to six-membered ethers having a lower aliphatic group as a side chain and chain ethers represented by the formula R—O—R' where R and R' are respectively either aliphatic groups of one to six carbon atoms, chlorine-substituted aliphatic groups of one to six carbon atoms, phenyl or lower alkyl-substituted phenyls.

Typical examples of these various ethers include propylene oxide, 1-butene oxide, cyclooxabutane, tetrahydrofuran, dihydrofuran, furan, methyl tetrahydrofuran, tetrahydropyran, dioxane, dimethyl dioxane, chloromethyldioxane, diethyl ether, dibutyl ether, methyl propyl ether, alpha-chloromethyl ether, beta-chloroethyl ether, phenymethyl ether, diphenyl ether, etc. Of these ethers, dioxane and tetrahydrofuran are preferably used.

The several components which are used for making up the catalyst to be used in the present invention, as hereinbefore described, when used individually, do not manifest the desired effects. The intended effects are manifested notably only upon combining the two components (a) and (b) or the components (a), (b) and (c). The catalyst composed of the three components (a), (b) and (c) is particularly effective in yielding, with high conversion, elastic polymers having high molecular weight and, moreover, of low crystallinity.

The proportion in which the aforesaid components making up the catalyst used in this invention are used are as follows: In the two-component catalyst, the molar ratio of the (b) component, the organoaluminum compound, to the (a) component, the metal salt of carboxylic acid (on the basic of the metal contained therein), ranges between 1:0.001 and 1:2.0, and preferably between 1:0.01 and 1:1.5. On the other hand, in the three-component catalyst, the molar ratio of the (b) component, the organoaluminum compound to the (c) component, the ether ranges between 1:0.005 and 1:15.0, and preferably between 1:01 and 1:10.0.

The catalyst is made up by mixing the components in the foregoing proportions. After mixing these components, the mixture is aged by maintaining it for a short period of time, e.g., 1 minute to a few hours (up to 3 hours) at a temperature ranging between room temperature and 300° C., with the proviso that it is higher than the temperature to be employed in the step of polymerizing the 1,2-epoxide. This temperature is preferably one in the range 100°–200° C., and about 20°–150 C., higher than the temperature of the polymerization step of the 1,2-epoxide. By preparing and aging the catalyst in this way, a composition is provided which, as previously described, is particularly effective in the homopolymerization and copolymerization of 1,2 -epoxides and which is superior in yield etc., when compared to a mixture of the above two or three components not so prepared.

The preparation of the catalyst is conveniently carried out in the presence of an inert solvent. The inert solvents which are preferably used include, e.g., aromatic hydrocarbons such as benzene, toluene and xylene and aliphatic hydrocarbons such as pentane, hexane, heptane and octane. It is however also possible to use halogenated hydrocarbons such as methylene chloride and tetrachlorethane singly or as a mixture with the foregoing hydrocarbons. Although the metal salt of a carboxylic acid component can also be used in its original solid or liquid form, its handling and metering is facilitated if it is used in a form dissolved in an inert organic solvent, e.g., toluene, xylene or turpentine oil.

The activity of the catalyst used in this invention is deteriorated by the action of water, oxygen and carbon dioxide. Hence, it is recommended that its preparation be carried out under an atmosphere of an inert gas such as nitrogen, helium and argon. Accordingly, the solvent and polymerization materials used should be those which have been purified by dehydrating and drying and care must also be exercised to ensure that the polymerization reaction is carried out under an inert atmosphere.

The activity of the catalyst according to this invention is great and consequently its use in a relatively small amount will suffice. Full satisfactory results can be obtained by using it with the 1,2-epoxides, the polymerization starting material, in an amount of 0.5–3.5 mol percent, based on the organoaluminum compound component. This is a smaller amount than that of the conventional processes wherein organoaluminum compounds are used as the catalyst component.

The polymerization or copolymerization of 1,2-epoxides according to the invention process can be carried out by either the bulk polymerization, solution polymerization or precipitation polymerization processes. However, for removing the polymerization heat generated during the polymerization reaction, preventing the solidification of the resulting polymer and carrying out the polymerization operation smoothly, it is preferred to use a 0.5- to ten-fold volume of solvent, based on the monomeric 1,2-epoxide. The solvent to be used in the polymerization reaction is suitably chosen from the organic solvents which are inert to the polymerization reaction, such as aromatic hydrocarbons, aliphatic hydrocarbons and halogenated hydrocarbons. While it is permissible to use the same solvent or a different one than that used in preparing the catalyst, it is an advantage from the operational standpoint to use the same solvent. Although the polymerization reaction can take place within a broad range of temperatures, for example between -20° and 150° C., it is preferred to operate the polymerization reaction within a temperature range of 0°–100° C. When the polymerization is carried out at proper reaction temperature, the extent of polymerization attains about 90 percent in a short period of time. The reaction time is usually of the order of about 10 hours, which is a comparatively short period when compared to that of the prior art. The reaction pressure is usually a range of from normal atmospheric pressure to 50 atmospheres, and preferably a range of from normal atmospheric pressure to 10 atmospheres.

The customary procedures can be employed for removing the catalyst or purifying the resulting polymer. Namely, after completion of polymerization reaction, the resulting polymer is dissolved, if necessary, using a suitable solvent, e.g., tetrahydrofuran, benzene, toluene, xylene, acetone or carbon tetrachloride, following which it is separated from the catalyst and unreacted monomer by means of the dissolution-precipitation method. As the precipitant, a solution consisting of methanol or water in which a small quantity of hydrochloric acid (0.2–10 vol. percent) has been mixed, is usually used.

While the properties of the 1,2-epoxide polymer obtained by the invention process are not necessarily uniform, being dependent upon the class of the material monomer, the class of the components of the catalyst and the polymerization reaction conditions, these products are in all cases suitably used as raw materials for the production of various kinds of shaped articles. Especially when the polymerization of 1,2-epoxides is carried out using the aforesaid three-component catalyst, polymers having a crystallinity of less than 30 percent, and particularly less than 20 percent, can be readily obtained in high yield in a short period of time. These polymers are suitably used for various elastic shaped articles and particularly for rubber materials excelling in resistances to heat, oil weather, ozone and permeation of gas.

The following examples and comparisons will further illustrate this invention. The reduced viscosity $\eta sp/c$ of the polymers obtained in the examples, unless otherwise noted, is a value obtained by measuring in dioxane of a concentration of 0.3 g./dl. at 30° C. in the case of the homopolymers and copolymers of epichlorohydrin, and a value obtained by measuring in benzene of a concentration of 0.2 g./dl. at 30° C. in the case of the other polymers. On the other hand, the crystallinity of the polymer, unless otherwise indicated, is a value obtained by measuring the crystallinity band of 720 cm.$^{-1}$ means of the infrared absorption spectrum analysis.

EXAMPLE 1

2.3 grams of turpentine oil solution of chromium octylate, said solution containing 8 percent of Cr as metal, 17.5 grams of benzene and 0.92 gram of triethylaluminum were mixed and heated for 60 minutes at 60° C. in an argon atmosphere to prepare the catalyst. After adding 23.6 grams of epichlorohydrin to this catalyst, the reaction was carried out for 10 hours at 60° C., with shaking. The reaction product was a light yellow solid. The resulting polymer was shaken with 450 grams of benzene, washed repeatedly with 1 N hydrochloric acid, and washed with alkali and water to eliminate the catalyst, followed by drying under reduced pressure at 50° C. 15.8 grams of polymer were obtained. The polymer was a tough, white elastic solid having a reduced viscosity $\eta sp/c$ of 2.25.

EXAMPLE 2–3

Catalysts were prepared by varying the class of carboxylic acid of chromium carboxylate and using them in the amounts indicated in the following table, adding respectively 17.5 grams of benzene and 0.92 gram of triethylaluminum and thereafter heating the mixtures for 60 minutes at 60° C. 23.6 grams each of epichlorohydrin were added to these catalyst solutions and reacted for 10 hours at 60° C., with the results shown in the following table depending upon the class of carboxylate used.

| Example | Chromium carboxylate | Amount of chromium carboxylate g. | Yield % | Reduced Viscosity |
|---|---|---|---|---|
| 2 | chromium acetate | 0.94 | 53.2 | 2.18 |
| 3 | chromium stearate | 0.86 | 50.8 | 2.25 |

EXAMPLES 4–9

After stoppered Erlenmeyer flasks were thoroughly purged with argon, they were each charged with 13.3 grams of n-hexane, 0.85 gram of triethylaluminum and the metal carboxylates in the amounts indicated in the following table. After allowing to stand for 2 hours at room temperature, 17.2 grams of propylene oxide were added to each flask, which was then stoppered. The reaction was carried out by allowing the reaction mixtures to stand still for 10 hours at 20° C. The reaction products were white to light yellow solids. These were treated and dried at 50° C. under reduced pressure to yield polypropylene oxides, with the following results:

| Example | Metal Carboxylate | Amount used of metal carboxylate g. | Yield (percent) | Reduced viscosity |
|---|---|---|---|---|
| 4 | Iron naphthenate xylene solution (containing 5% metal as Fe). | 1.12 | 57.1 | 1.70 |
| 5 | Cobalt octylate xylene solution (containing 8% metal as Co). | 0.75 | 59.5 | 2.00 |
| 6 | Lead octylate xylene solution (containing 20% metal as Pb). | 1.03 | 38.5 | 0.76 |
| 7 | Nickel octylate xylene solution (containing 5% metal as Ni). | 1.20 | 48.2 | 1.60 |
| 8 | Cobalt acetate | 0.25 | 60.2 | 1.98 |
| 9 | Manganese naphthenate xylene solution (containing 8% metal as Mn). | 0.68 | 20.8 | 0.51 |

Comparison 1

In a pressure-resistant 100-ml. glass ampul thoroughly purged with nitrogen were placed 20 ml. of propylene oxide and 20 ml. of n-hexane. After adding 0.7 gram of stannous oleate, the reaction was carried out for 48 hours at 30° C., with shaking, but no reaction product was observed. Even when n-hexane was not used as the solvent, the results were the same. Even when stannic oleate was used, polymerization did not take place by means of either solution polymerization or bulk polymerization. Further, when xylene solutions of stannic oleate and zirconium octylate (the solutions in both cases containing 12 percent as metal) were added in amounts such as to equal the amounts indicated above and the reaction was carried out in accordance with the same procedure, polymers were not obtained.

Comparison 2

Twenty ml. of propylene oxide and 20 ml. of n-hexane were place in a pressure-resistant 70-ml. glass ampul thoroughly purged with argon, after which triethylaluminum was added in an amount of 2.5 mol percent, based on the propylene oxide. The reaction was carried out by allowing the reaction mixture to stand still for 60 hours at 20° C. The resulting polymer was greaselike and its reduced viscosity in benzene at 30° C. was 0.04. The yield was 15 percent.

EXAMPLES 10–12

Polymerization reactions of epichlorohydrin were carried out using the various chromium carboxylate indicated in the following table. The catalysts were prepared by adding the chromium carboxylate, 17.5 grams of benzene, 0.46 gram of tetrahydrofuran and 1.30 grams of triisobutylaluminum, to a pressure-resistant ampul in a stream of an inert gas and then heating the ampul for 1 hour at 120° C. 23.6 grams of epichlorohydrin were added to each of the so prepared catalyst solutions and polymerized for 15 hours at 70° C., with shaking. After completion of the reaction, the reaction products were diluted with benzene and washed with a dilute hydrochloric acid aqueous solution, followed by concentration of the polymeric solution under reduced pressure and drying.

| Example | Organometallic compound, grams | Chromium carboxylate, grams | Tetrahydrofuran, grams | Yield, percent | Reduced viscosity | Crystalline portion, percent |
|---|---|---|---|---|---|---|
| 10 | Triisobutylaluminum 1.30. | 12% chromium naphthenate xylene solution 1.10. | 0.46 | 83 | 2.30 | 32 |
| 11 | do | 12% chromium octylate xylene solution 1.10. | 0.46 | 75 | 2.56 | 32 |
| 12 | do | Chromium stearate 1.13 | 0.46 | 56 | 1.20 | 32 |

EXAMPLES 13–15

Epichlorohydrin was polymerized using the various metal salts of carboxylic acid shown in the following table. The solution of a metal salt of carboxylic acid, 17.5 grams of benzene, 0.46 gram of tetrahydrofuran and 1.30 grams of triisobutylaluminum were added to a pressure-resistant ampul in a stream of an inert gas and heated for 30 minutes at 120° C., to prepare the catalyst. 23.6 grams of purified epichlorohydrin were added to each of the catalyst solutions, prepared as above, and polymerized for 20 hours at 80° C., with shaking. The polymers obtained by the reactions were treated as in Examples 10–12.

| Example | Metal Salt of Carboxylic Acid g. | Yield % | Reduced Viscosity | Crystalline portion % |
|---|---|---|---|---|
| 13 | 8% manganese octylate xylene solution 1.75 | 20 | 1.65 | 33 |
| 14 | 12% cobalt octylate xylene solution 1.25 | 28 | 1.95 | 29 |
| 15 | 8% nickel octylate xylene solution 1.85 | 42 | 0.96 | 22 |

EXAMPLE 16

0.63 gram of cobalt octylate containing 12 percent of Co as metal, 18 grams of hexane, 0.23 gram of tetrahydrofuran and 0.74 gram of triethylaluminum were mixed and then heated for 1 hour at 120° C. in an inert gas to prepare the catalyst. 14.8 grams of propylene oxide were added to this catalyst, and the polymerization reaction was carried out for 12 hours at 50° C., with shaking. The so obtained polymer was a bluish tinged and slightly elastic solid which was obtained in an amount of 9.5 grams (64.2 percent of theory). Its inherent viscosity, as measured in benzene at 30° C., was 1.80, and its acetone-insoluble portion was 28.9 percent.

We claim:

1. A process of preparing poly(epoxide)s which comprises polymerizing at least one 1,2-epoxide selected from the group consisting of ethylene oxide, propylene oxide, n-butylene oxide, isobutylene oxide, epihalohydrins, aliphatic glycidyl ethers, butadiene monooxide, and styrene oxide by contacting said 1,2-epoxide with a catalyst obtained by mixing
   a. at least one metal salt of carboxylic acid wherein the metal is selected from the group consisting of Pb, Cr, Mn, Co, Ni, and Fe, and the carboxylic acid is selected from the group consisting of aliphatic monocarboxylic acids containing from 2–18 carbon atoms, naphthenic acid and tall oil acid, and
   b. from about 0.5 to 3.5 mol percent, based upon the amount of polymerizable 1,2-epoxide, of at least one organoaluminum compound selected from the group consisting of trialkylaluminums and dialkylaluminum monohalides, wherein the alkyl group contains from one to six carbon atoms, in a molar ratio of said metal salt of carboxylic acid, based on the metal content, to said organoaluminum compound within the range of about 0.001:1 to 2.0:1, and thereafter holding the mixture of (a) and (b) in the absence of said 1,2-epoxide at a temperature of 100° to 300° C., said temperature being 20° to 150° C. higher than that of the step in which said 1,2-epoxide is polymerized, for a period ranging from 1 minute to a few hours.

2. The process of preparing poly(epoxide)s which comprises polymerizing at least one 1,2-epoxide selected from the group consisting of ethylene oxide, propylene oxide, n-butylene oxide, isobutylene oxide, epihalohydrins, aliphatic glycidyl ethers, butadiene monooxide, and styrene oxide by contacting said 1,2-epoxide with a catalyst obtained by mixing
   a. at least one metal salt of carboxylic acid, wherein the metal is selected from the group consisting of Pb, Cr, Mn, Co, Ni, and Fe, and the carboxylic acid is selected from the group consisting of aliphatic monocarboxylic acids containing 2–18 carbon atoms, naphthenic acid and tall oil acid,
   b. from about 0.5 to 3.5 mol percent, based upon the amount of polymerizable 1,2-epoxide, of at least one organoaluminum compound selected from the group consisting of trialkylaluminums and dialkylaluminum monohalides, wherein the alkyl group contains from one to six carbon atoms, and
   c. at least one ether selected from the group consisting of three- to six-membered cyclic ethers, three- to six-membered cyclic ethers containing a lower aliphatic group as a side chain and chain ethers represented by the formula R—O—R', wherein R and R' are respectively a member of the class consisting of aliphatic groups of one to six carbon atoms, chlorine substituted aliphatic groups of one to six carbon atoms, phenyl and lower alkyl-substituted phenyl groups, in the molar ratio of said metal salt of carboxylic acid, based on the metal content, to said organoaluminum compound within the range of about 0.001:1 to 2.0:1, and of said ether to said organoaluminum compound within the range of 0.005:1 to 15:1, and thereafter holding the mixture of (a), (b) and (c) in the absence of said 1,2-epoxide at a temperature of 100° to 300° C., said temperature being 20° to 150° C. higher than that of the step in which said 1,2-epoxide is polymerized, for a period ranging from 1 minute to a few hours.

3. The process of claim 1 wherein said organoaluminum compound is trialkylaluminum, wherein the alkyl group contains from one to six carbon atoms.

4. The process of claim 2 wherein said organoaluminum compound is a trialkylaluminum wherein the alkyl group contains from one to six carbon atoms.

5. The process of claim 2 wherein said ether of (c) is tetrahydrofuran.

6. The process of claim 2 wherein said ether of (c) is propylene oxide.

* * * * *